(12) United States Patent
Freeman et al.

(10) Patent No.: US 6,263,103 B1
(45) Date of Patent: Jul. 17, 2001

(54) ESTIMATING SCENES USING STATISTICAL PROPERTIES OF IMAGES AND SCENES

(75) Inventors: William T. Freeman, Acton; Egon C. Pasztor, Jamaica Plain, both of MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/203,108

(22) Filed: Nov. 30, 1998

(51) Int. Cl.[7] ........................................... G06K 9/34
(52) U.S. Cl. ..................... 382/173; 345/435; 348/700; 382/156; 382/294
(58) Field of Search ........................ 382/100, 156, 382/158, 160, 171–173, 195, 228, 284, 159, 181, 190, 294, 103; 342/159, 25, 64; 348/700; 345/433–435

(56) References Cited

U.S. PATENT DOCUMENTS

| 5,341,142 | * | 8/1994 | Reis et al. | 342/64 |
| 6,141,019 | * | 10/2000 | Roseborough et al. | 345/473 |
| 6,151,424 | * | 11/2000 | Hsu | 382/294 |
| 6,199,030 | * | 3/2001 | Stone | 703/8 |
| 6,208,295 | * | 3/2001 | Dogan et al. | 342/378 |

OTHER PUBLICATIONS

Regazzoni et al., "Multilevel GMRF–based Segmentation of Image Sequences", University of Genova, Genova, Italy, IEEE, May 1992, pp. 713–716.*
Michael I. Jordan, et al.; "An Introduction to Variational Methods for Graphical Modes"; *Learning in Graphical Models*; Kluwer Academic Publishers.
Yair Weiss; "Belief Propagation and Revision in Networks with Loops"; Center for Biological and Computational Learning, Department of Brain and Cognitive Sciences, Paper No. 155; Massachusetts Institute of Technology, Nov., 1997.
Yair Weiss; "Interpreting Images by Propagating Bayesian Beliefs"; *Advances in Neural Information Processing Systems*, M.C. Mozer, M.I. Jordan and T. Petsche, editors; 1997.

* cited by examiner

*Primary Examiner*—Jayanti K. Patel
(74) *Attorney, Agent, or Firm*—Dirk Brinkman

(57) ABSTRACT

A method for estimating scenes from images generates a plurality of scenes and renders an image for each scene. The scenes and corresponding images are partitioned into patches. Each patch is quantitized as a vector and probability density function is fitted to each vector. The patches and probability densities are organized as a Markov network where local probability information is propagated to neighboring nodes. After propagation, the probability density at each node is used to estimate the scene.

11 Claims, 13 Drawing Sheets

ESTIMATING SCENES USING STATISTICAL PROPERTIES OF IMAGES AND SCENES

FIELD OF THE INVENTION

This invention relates generally to computer vision, and more particularly, to estimating characteristics of scenes represented by images.

BACKGROUND OF THE INVENTION

One general problem in computer vision is how to determine the characteristics of a scene from images representing the underlying scene. Following are some specific problems. For motion estimation, the input is usually a temporally ordered sequence of images, e.g., a "video." The problem is how to estimate the projected velocities of various things—people, cars, balls, background moving in the video. Another problem deals with recovering real-world three-dimensional (3D) structure from a 2D image. For example, how to recover the shape of an object from a line drawing, a photograph, or a stereo pair of photographs. Yet another problem is how to recover high-resolution scene details from a low-resolution image.

Humans make these types of estimates all the time, frequently sub-consciously. There are many applications for machines to be able to do this also. These problems have been studied by many workers with different approaches and varying success for many years. The problem with most known approaches is that they lack machine learning methods that can exploit the power of modern processors within a general framework.

In the prior art, methods have been developed for interpreting blocks world images. Other prior art work, using hand-labeled scenes, has analyzed local features of aerial images based on vector codes, and has developed rules to propagate scene interpretations. However, these solutions are for specific one-step classifications, and therefore, cannot be used for solving a general class of low-level vision problems. Methods to propagate probabilities have been used, but these methods have not been put in a general framework for solving vision problems.

Alternatively, optical flow can be estimated from images by using a quad-tree to propagate motion information across scale. There, a brightness constancy assumption is used, and beliefs about the velocity of the optical flow is presented as a gaussian probability distribution.

SUMMARY OF THE INVENTION

The present invention analyzes statistical properties of a labeled visual world in order to estimate a visual scene from corresponding image data. The image data might be single or multiple frames; the scene characteristics to be estimated could be projected object velocities, surface shapes, reflectance patterns, or colors. The invention uses statistical properties gathered from labeled training data to form "best-guess" estimates or optimal interpretations of underlying scenes.

Accordingly, training data for typical images and scenes are synthetically generated. A parametric vocabulary for both images and scenes is generated. The probability of image parameters, conditioned on scene parameters (the likelihood function), is modeled, as is the probability of scene parameters, conditioned on neighboring scene parameters. These relationships are modeled with a Markov network where local evidence is propagated to neighboring nodes to determine the maximum a posteriori probability of the scene estimate.

Humans perform scene interpretations in ways that are largely unknown and certainly mathematically undeterminable. We describe a visual system that interprets a visual scene by determining the probability of every possible scene interpretation for all local images, and by determining the probability of any two local scenes neighboring each other. The first probability allows the visual system to make scene estimates from local image data, and the second probability allows the these local estimates to propagate. One embodiment uses a Bayesian method constrained by Markov assumptions.

The method according to the invention can be applied to various low-level vision problems, for example, estimating high-resolution scene detail from a low-resolution version of the image, and estimating the shape of an object from a line drawing. In these applications, the spatially local statistical information, without domain knowledge, is sufficient to arrive at a reasonable global scene interpretation.

Specifically, the invention provides a method for estimating scenes from images. A plurality of scenes are generated and an image is rendered for each scene. These form the training data. The scenes and corresponding images are partitioned into patches. Each patch is quantified as a vector, and the vectors are modeled as a probability density, for example, a mixture of gaussian distributions. The statistical relationship between patches are modeled as a Markov network. Local probability information is iteratively propagated to neighboring nodes of the network, and the resulting probability density at each node, a "belief," is read to estimate the scene.

In one application of our invention, it is possible to estimate high-resolution details from a blurred, or lower-resolution image. A low-resolution image is the input "image" data, and the "scene" data are the image intensities of the high-resolution details. The invention can also be used to estimate scene motion from a sequence of images. In this application, the image data are the image intensities from two successive images of the sequence, and the scene data are successive velocity maps indicating projected velocities of the visible objects at each pixel position. Another application for our invention is shading and reflectance disambiguation.

BRIEF DESCRIPTION OF THE DRAWINGS

FIG. 4b is an initial mixture of gaussian distributions fit to the distribution shown in the histogram of FIG. 4a;

DETAILED DESCRIPTION OF PREFERRED EMBODIMENTS

Introduction

We described a method that uses statistical properties of a labeled visual world to estimate characteristics of a scene using either a single image or multiple images. Scene characteristics to be estimated can include projected velocities of objects in the scenes, surface shapes of objects, reflectance patterns, or colors. Our general method can be applied to a number of low-level vision problems.

Generate Random Scene and Image for Training Data

Figure 1:
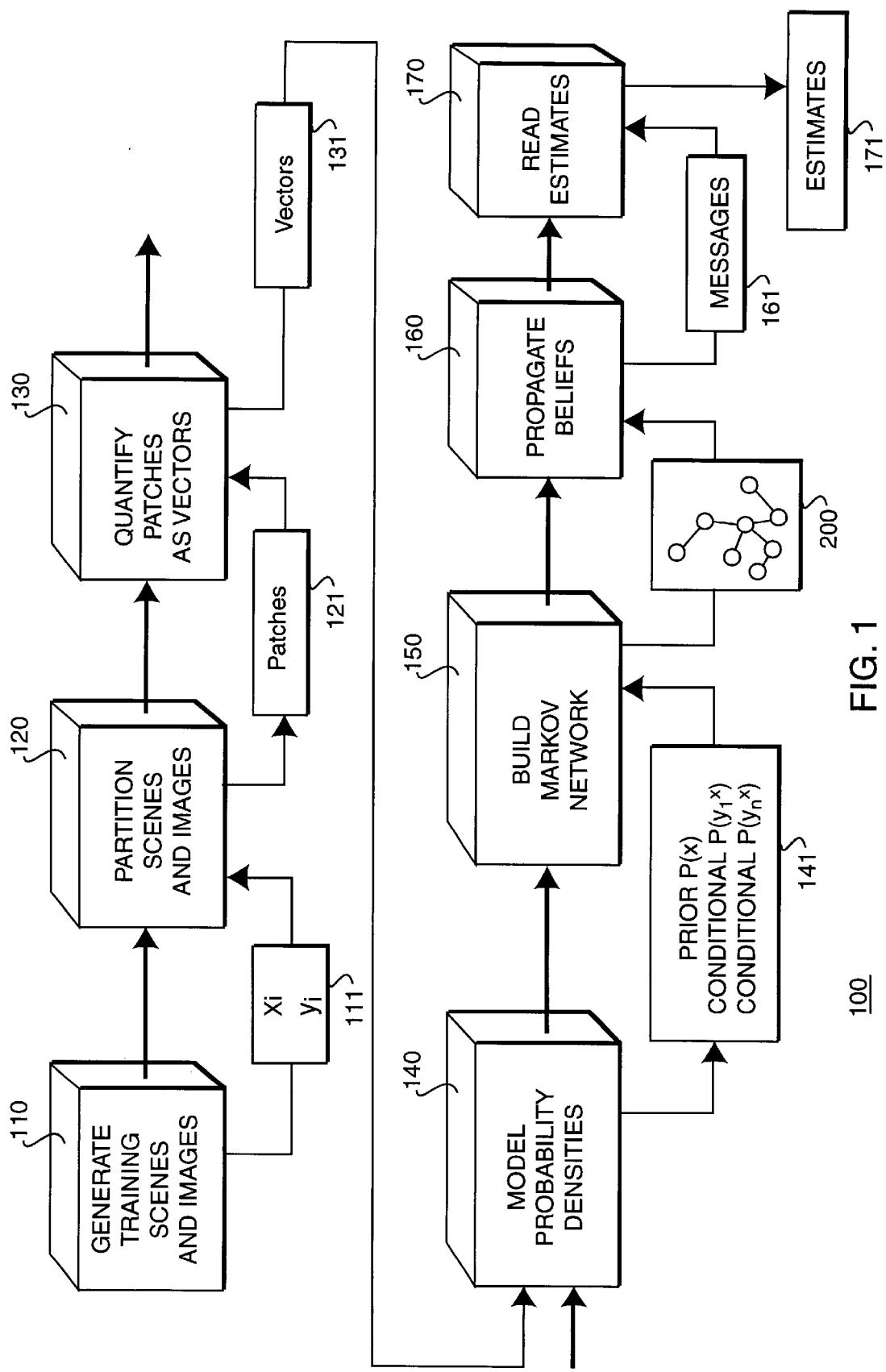
FIG. 1 is a flow diagram of a method for estimating scenes from images according to the invention.

As shown in FIG. 1, our general method 100 generates random scenes ($x_i$) and images ($y_i$) as training data 111 in step 110. The random scenes and rendered images can be generated synthetically using computer graphics. The synthetic images should be somewhat typical of the images to be processed by the system.

Partition Scene and into Patches

In step 120, the scenes and corresponding images are partitioned into local patches 121. The partitioning can be a patchwork of squares that overlay the scene and image. The patches can have multiple sizes, and the patches can be redundantly overlaid. For example, the patches can be formed at multiple of a gaussian pyramid. The pyramid can have, for example, five levels of resolution—from fine to coarse. In addition, the patches can represent image information as viewed through oriented filters of different orientations.

All patches of a given set of criteria, such as resolution and orientation, but differing spatially, are said to be of the same class, and are assumed to be drawn from the same statistical distribution. The sizes of the patches are small enough to allow modeling, yet large enough to convey meaningful information about the overall scene.

Quantify Patches as Vectors

In step 130, principle components analysis (PCA) is used to determine a representation for each patch. Each patch is expressed as a linear combination of basis functions. We represent the patches 121 as a low-dimensional vector 131. For example, each scene patch can be represented as a five-dimensional vector, and each image patch as a seven-dimensional vector. In other words, we represent the patches of the random training data, scenes and images respectively, as points in, say, a five-dimensional and seven-dimensional space.

Model Probability Density of Training Data

Step 140 models the probability density of all the training data in these low-dimensional spaces with mixtures of gaussian distributions. We use the training data to estimate probabilities of local patches in a most general form as:

P(scene), P(image|scene) and P(neighboring scene|scene).

More formally, we model three probability densities 141:

(1) the prior probability of each scene element x, there is a different prior probability for each class of scene element;

(2) the conditional probability of a scene element x, given the associated image element y: that is, P(y|x); and (3) the conditional probability of a scene element $x_1$ and a neighboring scene element, $x_2$, that is $P(x_1|x_2)$.

A neighboring element may be one that is adjacent in spatial position, but also may be one that is nearby in any one of the class attributes, such as scale or orientation.

It may be useful to modify the training data so that it has a probability distribution that is easier to fit with the mixtures of gaussian distributions. For real images, many distributions of interest have a very sharp spike at the origin. This peak is hard to fit and manipulate with mixtures of gaussians. From our statistical analysis of labeled visual data, we can find the prior probabilities of the scene data. We can than make a second pass through the training data, and randomly omit each training sample with a probability inversely proportional to the prior probability of the scene data. This gives a biased set of data which will have an easier-to-model probability distribution.

Build Markov Network

In step 150, the patches and their associated probability densities are organized into a Markov network 200 that represents the statistical relationship of scenes and images. In the Markov network, the nodes represent the low-dimensional vectors, nodes $x_i$ the scenes, and nodes $y_i$ the images. The edges connecting the nodes represent the statistical dependencies between the nodes.

Also, if a gaussian pyramid is used, then nodes at a given resolution level can be connected to spatially neighboring nodes at the same level as well as to nodes at the same spatial position in an adjacent resolution level. Furthermore, connections can be made to scene elements varying in some other dimension, such as oriented filter orientation.

These connections assist in removing spatial artifacts while estimating scenes. The connected Markov network 200 allows each scene node to update its belief based on accumulated local evidence gathered from other nodes. The belief is the combined probability density that will form the final best estimate.

Iteratively Propagate Beliefs and Read Best Estimate

Based on rules described below, step 160 iteratively propagates the Bayesian "belief" at each node to neighboring nodes via messages 161. Bayesian or regularization approaches have been used in low-level vision problems in the past. However, to contrast with the prior art, we train from labeled image data, and use strong Markovian assumptions.

In step 170, the best estimates 171 at each node for the underlying scene is read given the observed image information. This can be done by examining the probability distribution for the belief at each node, and either taking the mean or the maximum value of that mixture of gaussians distribution. This can tell us what scene value is the best estimate for the true underlying scene at that position, given the observed image data.

Example of a 3×3 Markov Network

Figure 2:
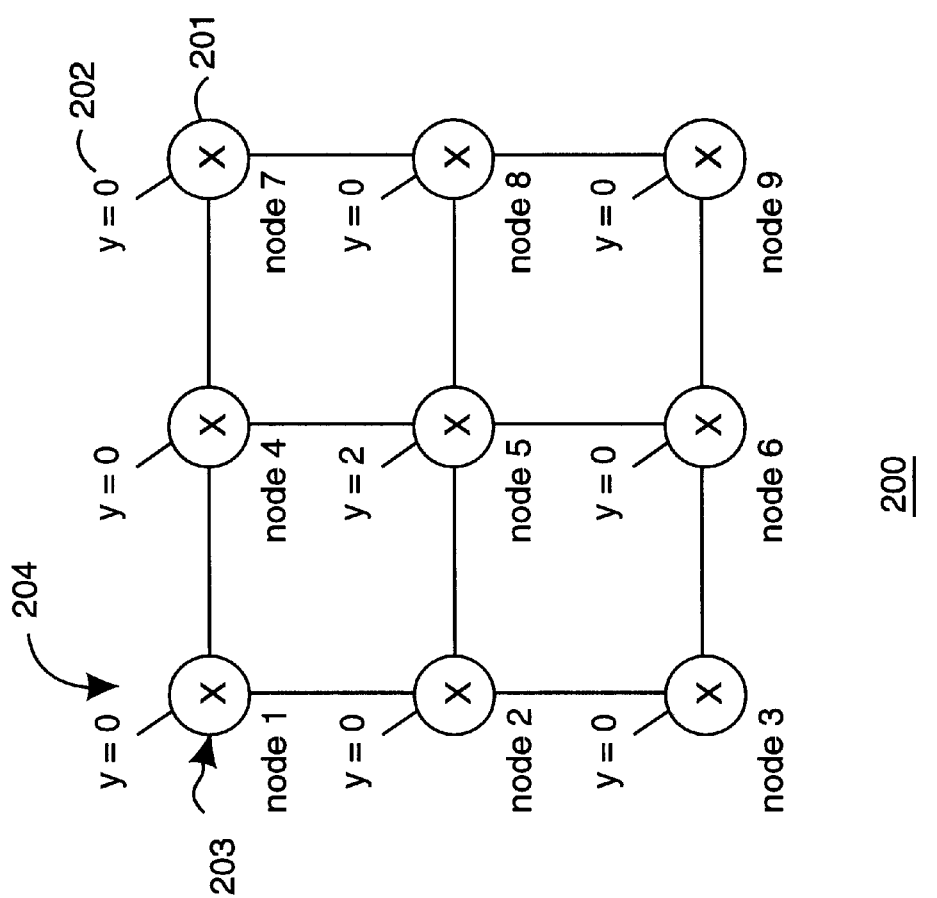
FIG. 2 is a graph of a network for propagating beliefs of the method.

FIG. 2 shows a simple 3×3 Markov network 200. For simplicity, we make all data one-dimensional so that the data can be plotted. The "scene data" to be estimated are the 1D x 201 at each node. The 1D image data y 202 that falls on each node will be used to estimate what x is.

In normal use of the invention, we generate randomly composed computer graphic scenes and their corresponding rendered images in order to create a training set of images and scenes. Those are used to generate vectors representing training patches of images and scenes from which we gather the desired prior and conditional statistics.

For this simple example, however, we will make up synthetic data corresponding to the vectors which would represent the training patches of images and scenes. We will make up the underlying joint probability relationships governing images and scenes.

Figure 3:
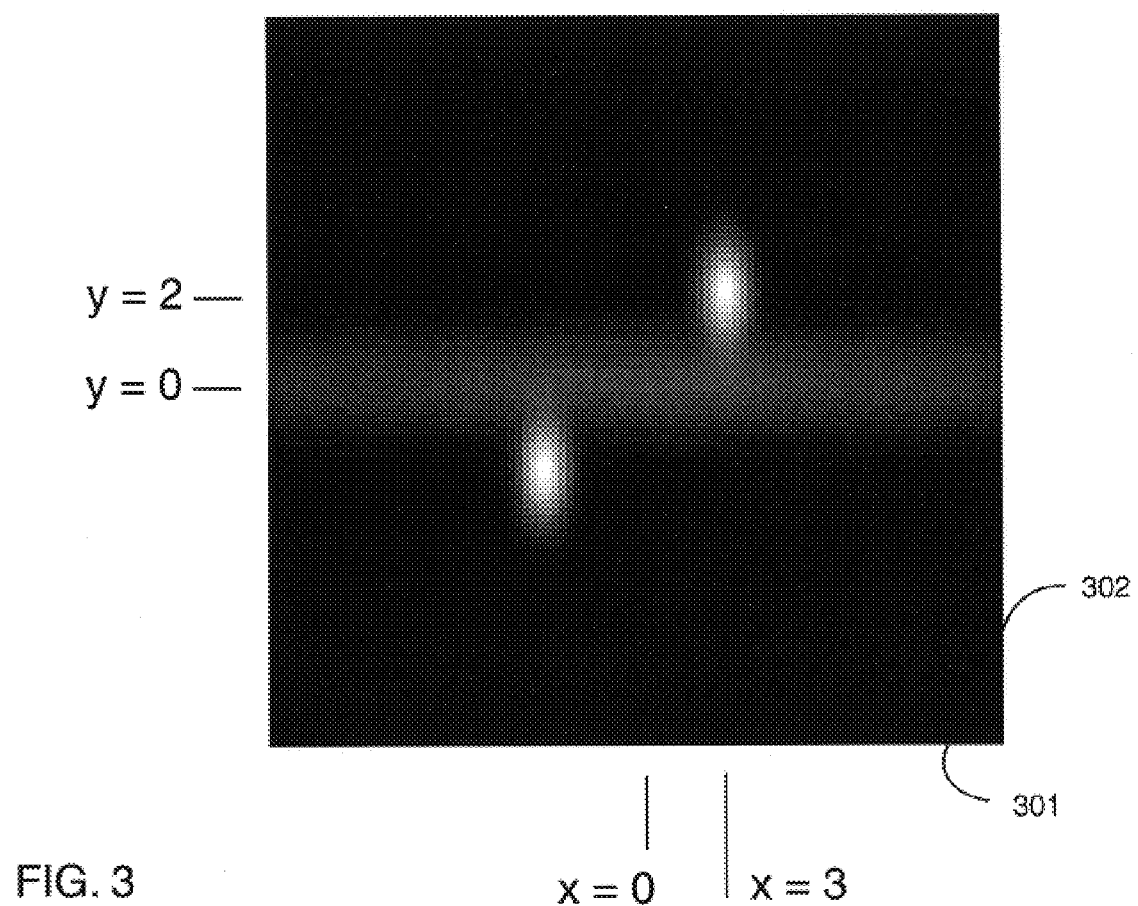
FIG. 3 is a graph of a true underlying joint probability relating a scene variable x with an image variable y.

FIG. 3 shows the joint probability relationship 300 of the variables x and y for the simple example. In FIG. 3, the variable x is along the horizontal axis 301, and the variable y is along the vertical 302. If y is zero, then the variable x can have one of many possible values as shown by the broad distribution of fuzzy horizontal line 303 at the middle of FIG. 3. If the observation y is 2, then x will be somewhere near 3.

Furthermore, in our simple example, the relationship between the values x of neighboring scene patches is as follows: we always multiply the scene data x by 2 when we go down a "row" 203 of the network 200, and we multiply the scene data x by 1.5 when we go to the right one column 204.

For our simple example, we make up the image data y which falls on the nodes. Again for simplicity, all the nodes, except node 5 are set with y=0. Therefore, all nodes have broad uncertainty as to their values. Node 5 has an observed value y=2. In this case, the observed value of the center node 5 should almost certainly be 3. The Bayesian belief propagation will then take care of propagating that knowledge to all the other nodes in the network 200. The final estimate should be at node 5 where x=3, and other nodes should have their x values scaled up or down by factors of 1.5 or 2 for each right horizontal or downward step, respectively, away from node 5 (and scale by $1/1.5$ and ½ going in the other directions).

The example network 200 is a nine node tree where the nodes are numbered sequentially, starting with 1 at the root of the tree. A local scene state of the ith node is $x_i$, and the image evidence at the ith node is $y_i$.

Following the steps of our general method 100 outlined above, we proceed as follows. We collect training data from a computer graphic simulation of the problem. For this example problem, we generate simulated data by drawing from the known joint distributions of y and x, and of $x_1$ and its neighboring node's $x_2$.

For the simple 1D problem, it is not necessary to perform principle components analysis (PCA) to reduce the dimensionality of the data collected at each node. We next estimate the desired joint probabilities using a mixture of gaussians probability model, please see Bishop "Neural networks for pattern recognition," Oxford, 1995.

Figure 4A:
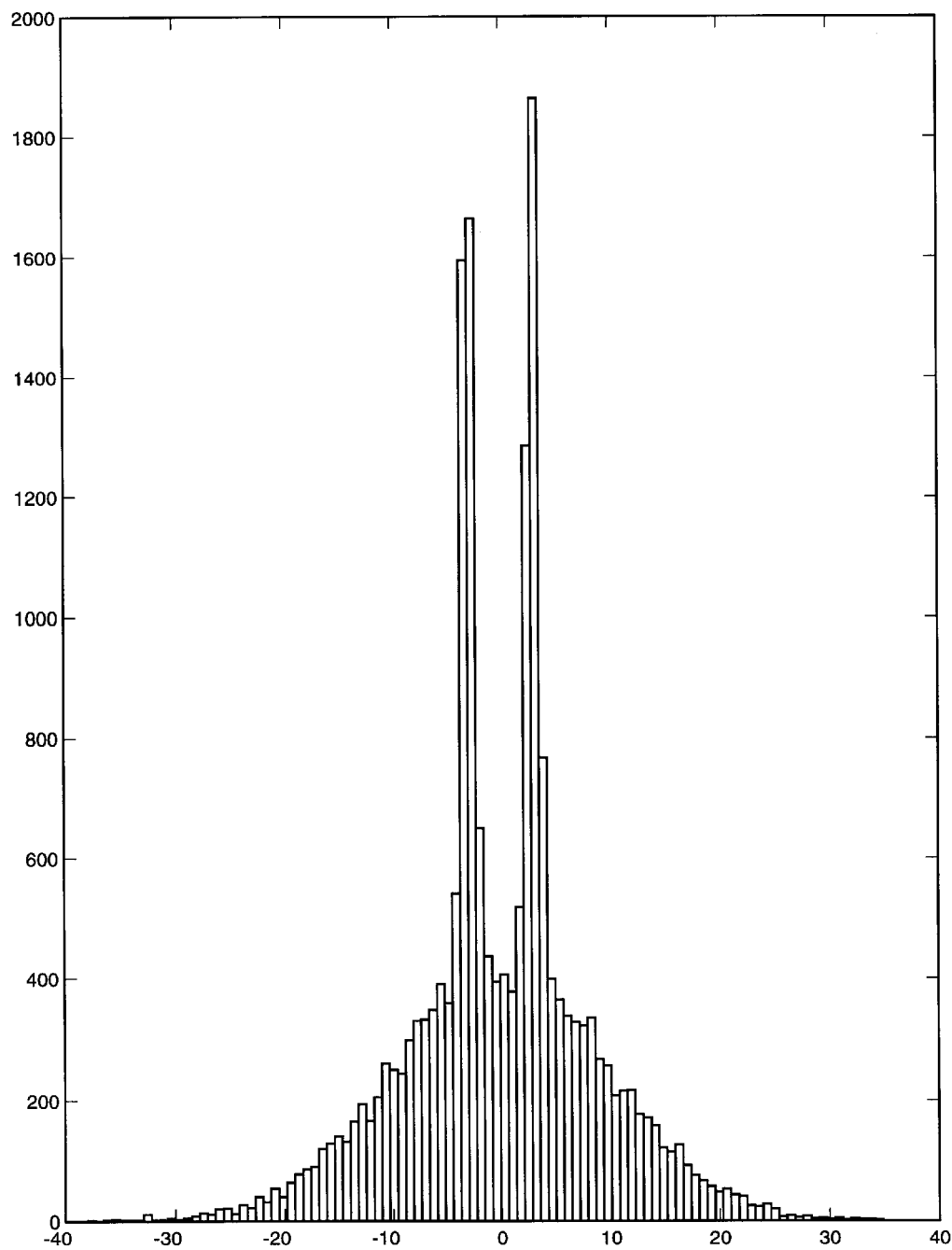
FIG. 4a is a histogram of scene values observed in training data.
Figure 4B:
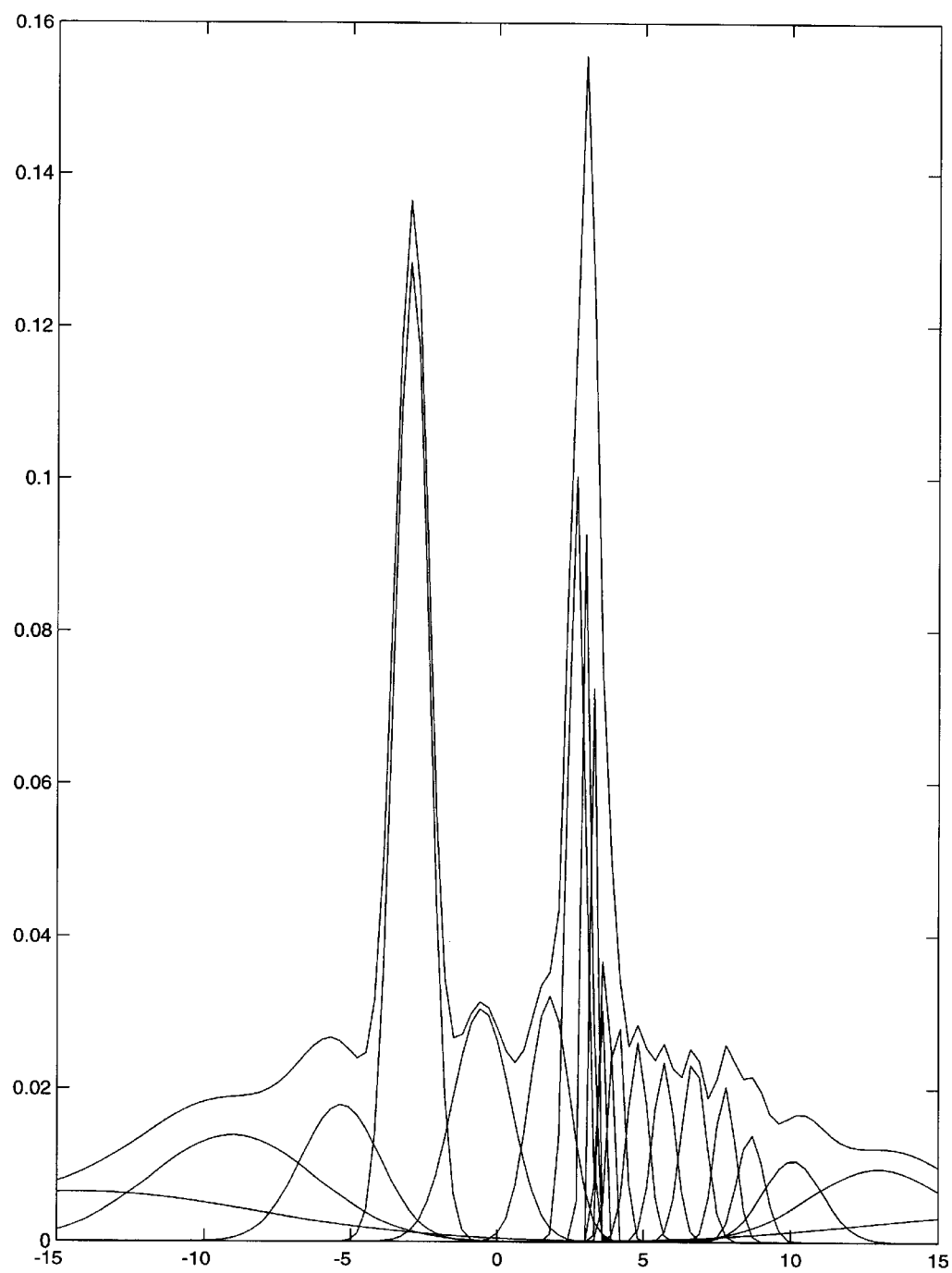
Figure 4C:
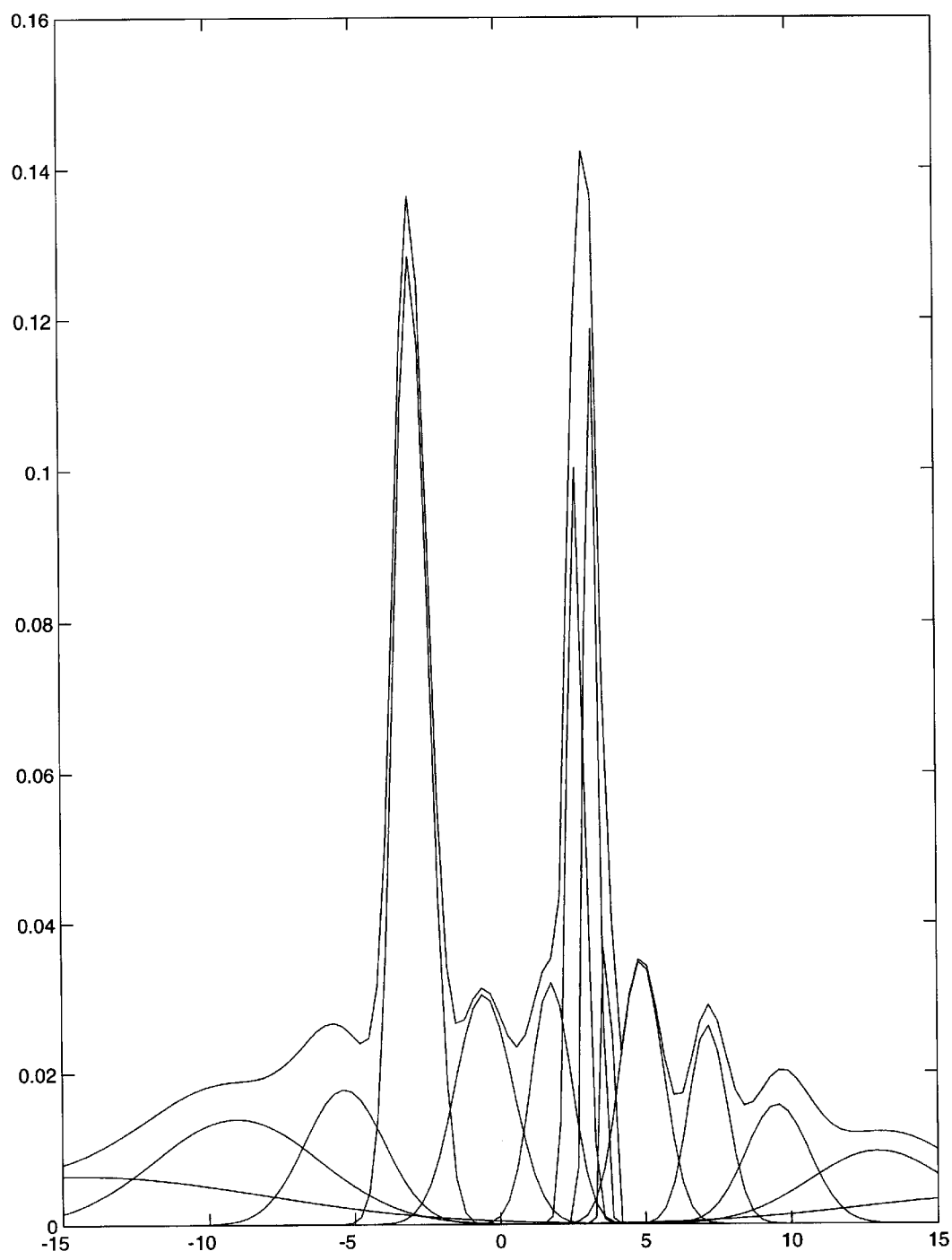
FIG. 4c is a pruned version of the fit of FIG. 4b.

FIG. 4a shows histograms of the observed values of x, FIG. 4b a mixture of gaussian distributions fit to that prior probability density, and FIG. 4c a pruned version of that mixture of gaussians. For reasons described below, we prune after each multiplication, or fitting of probabilities.

Figure 5A:
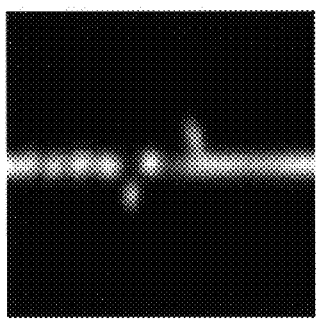
FIGS. 5a–5c show a mixture of gaussian fits to conditional probabilities observed in training data.
Figure 5B:
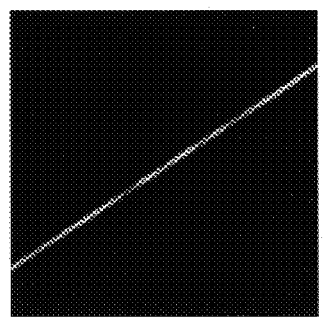
Figure 5C:
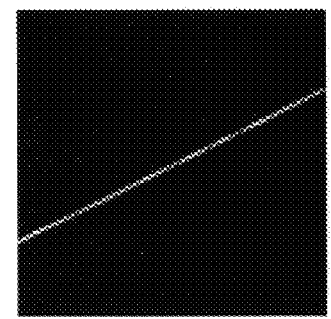

FIGS. 5a–c show mixtures of gaussians fit to some of the needed conditional probabilities 141. We fit a mixture of gaussian to model conditional probabilities P(a|b) by using the joint data for a and b co-occurrences, and weighting the points by 1/P(b), given P(a, b)/P(b)=P(a|b). FIG. 5a shows a mixture of gaussian fit to the probability density y given x, FIG. 5b a mixture of gaussian fit to the probability density of the neighbor to the right of x, given the value of x, a line with a slope of $1/1.5$. FIG. 5c shows a mixture of gaussian fit to the probability density of the neighbor below x, given the value of x, a line with a slope of ½.

We iteratively calculate the belief at each node, according to the rules described below. The first step is to determine what message to pass from each node to each of its neighbors.

Figure 6A:
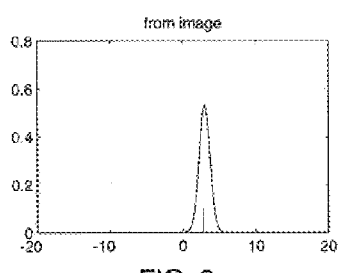
FIGS. 6a–6d graphs of probabilities at various nodes of the network.
Figure 6B:
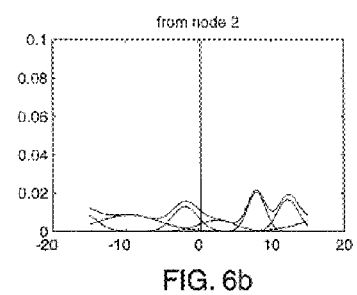
Figure 6C:
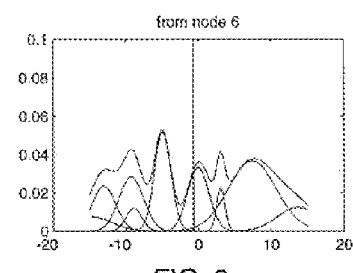
Figure 6D:
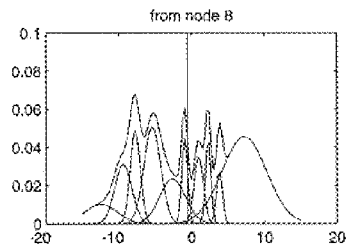

FIGS. 6a–6d show graphically each of the probabilities to be multiplied together to generate the message that node 5 passes to the node above it, node 4, on the first iteration. FIG. 6a is the probability from the image, FIG. 6b is from node 2, FIG. 4c from node 6, FIG. 6d from node 8.

Figure 6E:
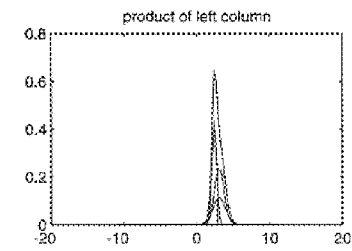
FIG. 6e is the product of the probabilities shown in FIGS. 6a–6d.
Figure 6F:
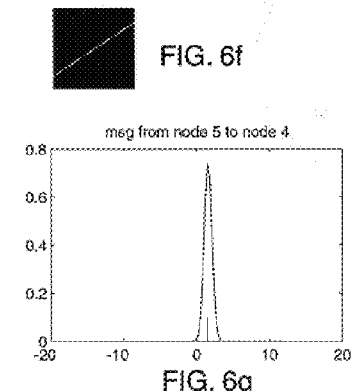
FIG. 6f is a graph of a conditional density.
Figure 6G:
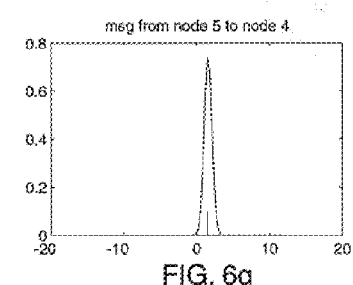
FIG. 6g is the probability that is passed in a message.

FIG. 6e is the product of the distributions shown in FIGS. 6a–6d. The dimensionality of the distribution shown in FIG. 6e is then augmented to equal the dimensionality of the distribution shown in FIG. 6f by keeping the distribution constant in the dimensions contained in 6f but not in 6e. That augmented distribution is then multiplied by the conditional density shown in FIG. 6f, and then marginalized along the dimensions of the distribution contained in FIG. 6e. The result is the message 161 sent from node 5 to node 4, shown in FIG. 6g.

Figure 7:
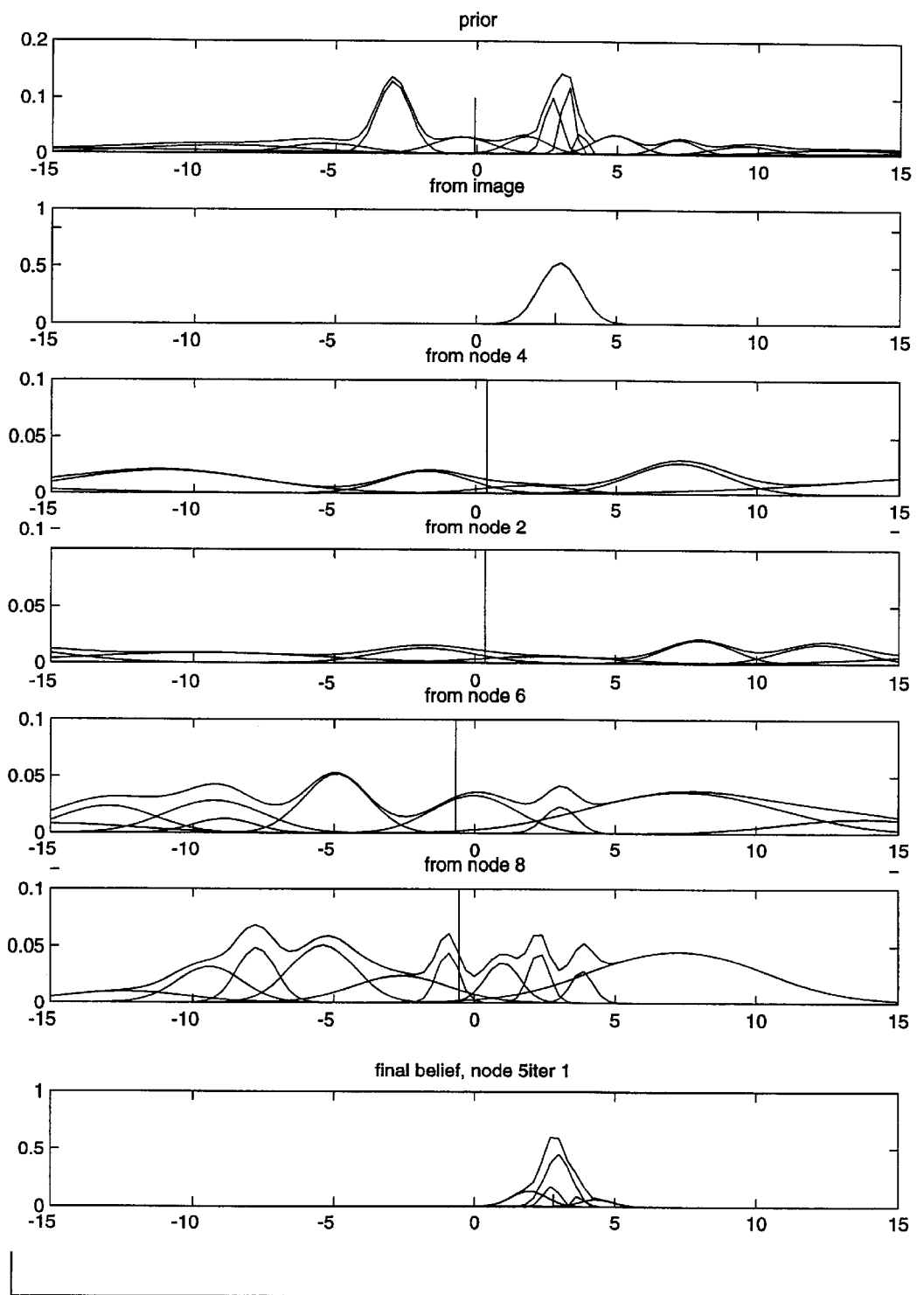
FIG. 7 is a graph of the probabilities combined to form the belief of a node.

FIG. 7 shows graphically the probabilities being multiplied together to compute the message that node 5 sends to node 4 in the order of prior probability, the message from the local image data, from the local image data, from neighboring node 4, node 2, node 6, and node 8, and the final belief (estimate) from the image at node 5 at the end of the first iteration.

Figure 8:
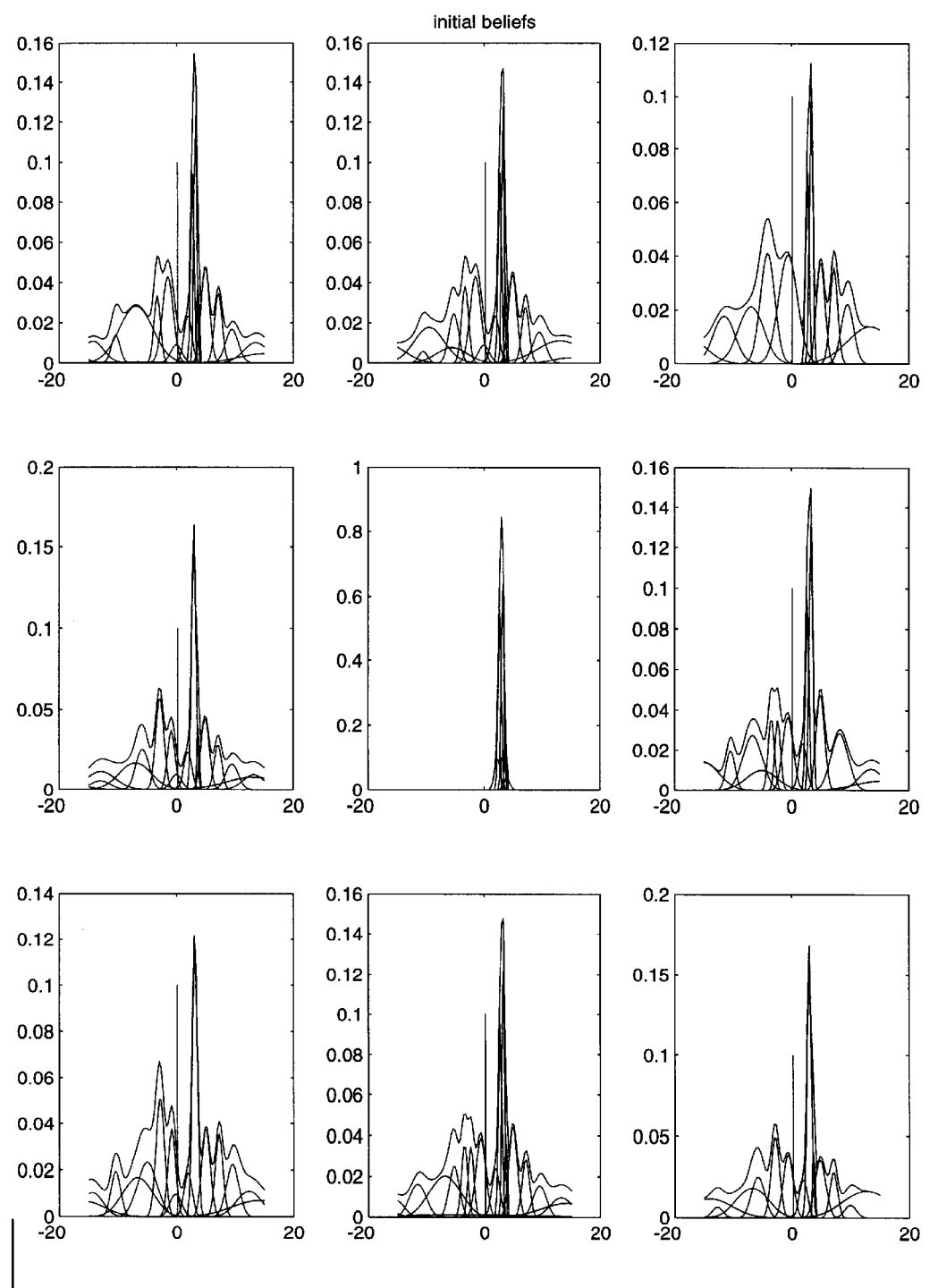
FIG. 8 is a graph of the initial probabilities.
Figure 9:
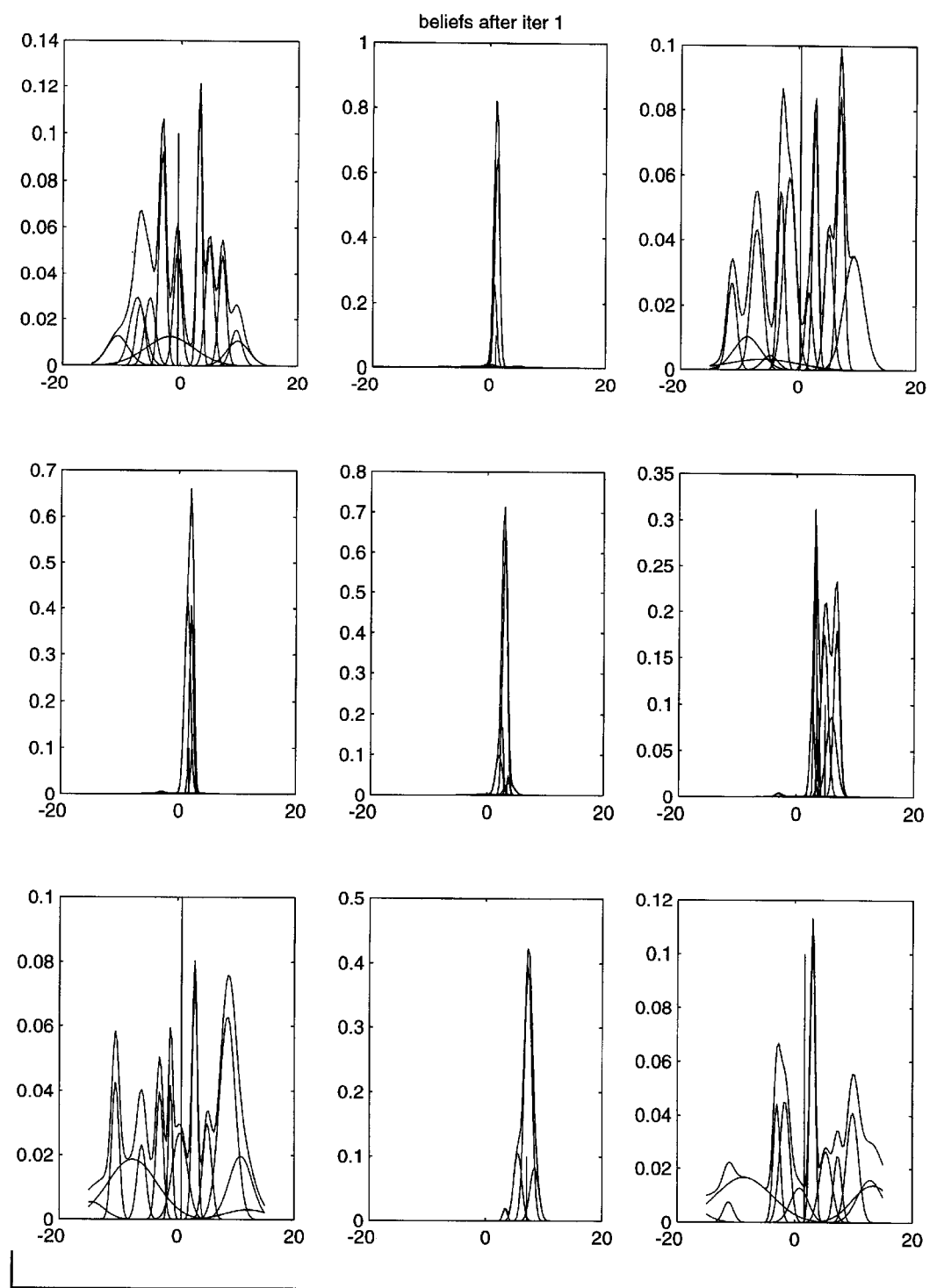
FIGS. 9–10 are graphs of probabilities after one and two iterations.
Figure 10:
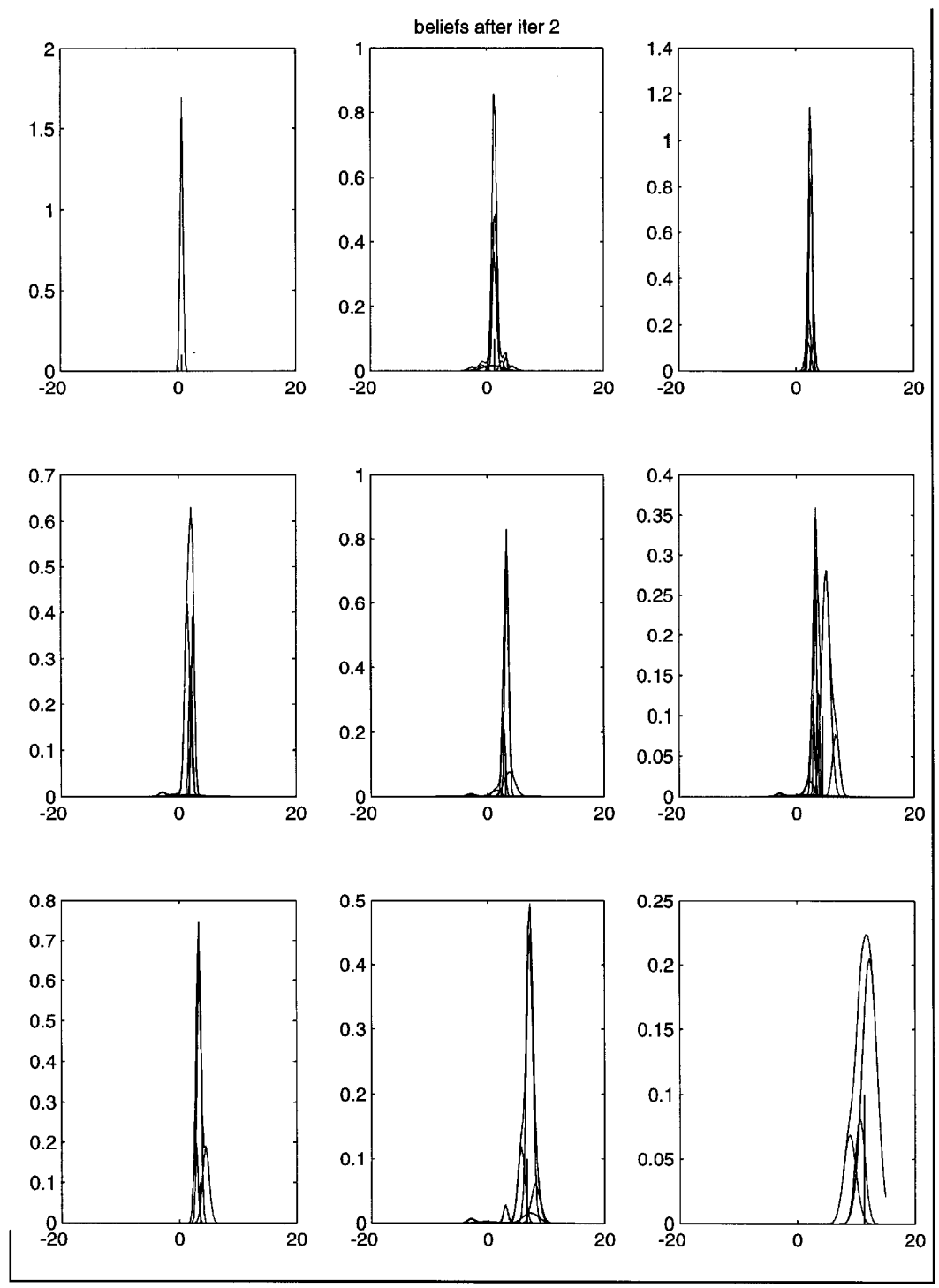

FIGS. 8–10 show the "belief" at each node in the network during the first three iterations of our method. As shown in FIG. 8, no information has yet been passed between the nodes, and each node relies only on its local image information, y to estimate its x value. Because all the nodes, except node 5, saw y=0, they have received little information about their x values, and their beliefs about their x values are very broad distributions. Node 5 knows its x value is near 3 because this is implied by y=2. The belief shown at each node is P(y|x) P(x), for the appropriate value of y at each node.

On the second pass, every node has shared its information with its neighboring nodes as shown in FIG. 9. Nodes 2, 4, 6, and 8 have received informative messages from node 5, the only node that knows what value of x it probably has, and these nodes adjust their beliefs about their values of x accordingly. The distributions shown at each node are P(y|x) P(x) times messages from each of the node's neighbors.

By the third pass, every node has heard from all neighbors two away, and therefore every node has received the knowledge from node 5. After the third pass, the mean or maximum value of each node's belief is approximately what it should be: node 5 has x has the approximate value of 3, with the other x values scaled up or down by 1.5 for jumps to the right, and 2 for jumps down.

Mixture Pruning

A probability mixture of N gaussians, when multiplied by a probability mixture of M gaussians, yields a mixture of NM gaussians. Thus, when mixtures of gaussians are multiplied together, the number of gaussians rises quickly and we must prune the gaussians. One could simply threshold out gaussians with very small weights from the mixture, however, this can give inaccurate mixture fittings. A better pruning process is given in Appendix A. Appendix B details the step of a process to determine the Kulbeck-Leibler distance between the pruned and unpruned mixtures.

Factorize the Joint Probability

Figure 11:
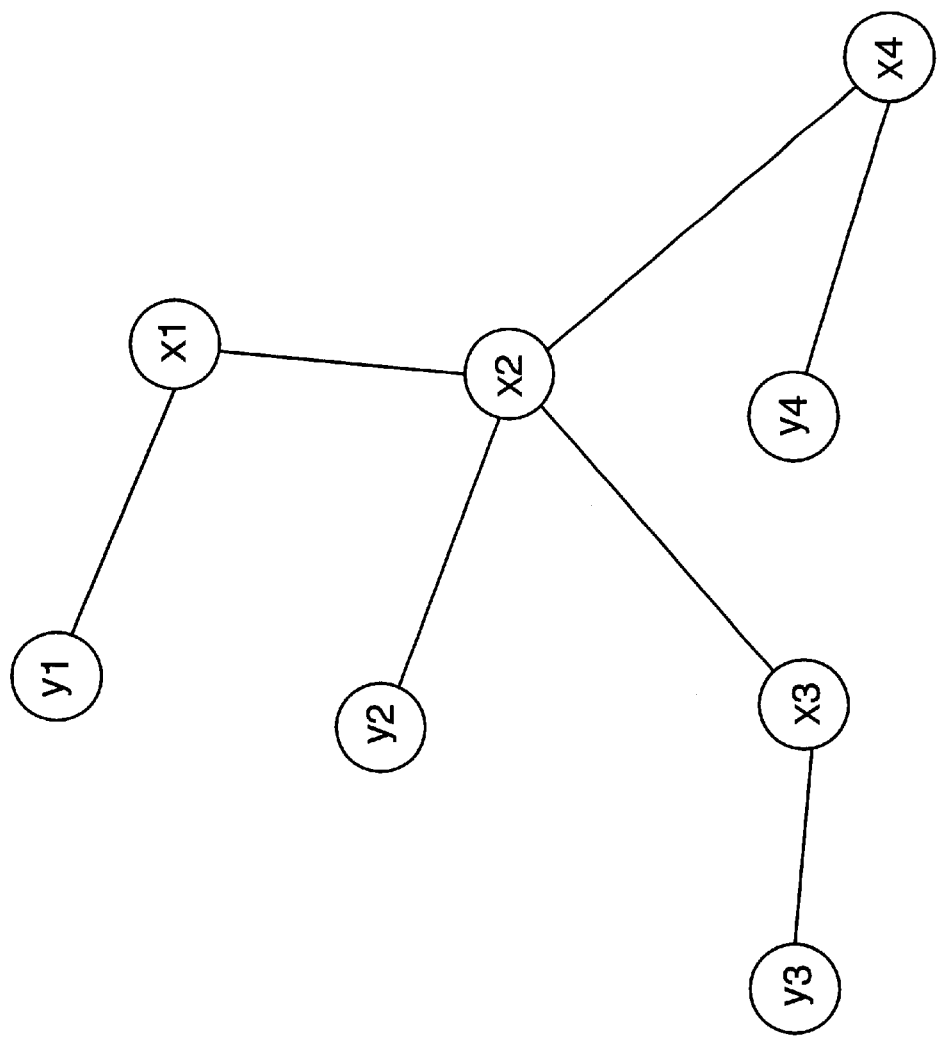
FIG. 11 is a graph of a Markov network having four scene and image nodes.

The details of factorizing the joint probabilities that are used for propagating local evidence to neighboring nodes is described with reference to FIG. 11. The network shown in FIG. 11 has four scene and image nodes, respectively:

$$x_1, \ldots, x_4, \text{ and } y_1, \ldots, y_4.$$

We seek a factorization of the joint probability that yields local evidence propagation rules. Our factorization uses three probability manipulation rules repeatedly.

Rule [1] According to elementary probability: $P(a, b) = P(a|b) P(b)$.

Rule [2] If node b is between nodes a and c, then $P(a, c|b) = P(a|b)P(c|b)$. This is the statement of the conditional independence of a and c, given b.

Rule [3] If node b is between nodes a and c, then $P(c|a,b) = P(c|b)$. This is the Markov property that lets us summarize our knowledge of the rest of the chain by our knowledge of its nearest node.

Note, none of these three rules requires the edges connecting the nodes to be directed. This avoids having to make arbitrary choices about causal relationships in the network 200.

For the maximum a posteriori (MAP) probability estimate of the parameters $x_1, x_2, x_3, x_4$, we want to determined $\text{argmax}_{x_1, x_2, x_3, x_4} P(x_1, x_2, x_3, x_4 | y_1, y_2, y_3, y_4)$. This conditional probability differs from the joint probability $P(x_1, x_2, x_3, x_4, y_1, y_2, y_3, y_4)$ by a factor that is constant over the arguments varied. Therefore, we can equivalently choose to find $\text{argmax}_{x_1, x_2, x_3, x_4} P(x_1, x_2, x_3, x_4, y_1, y_2, y_3, y_4)$, which is simpler to determine.

An alternate useful estimate of each parameter $x_i$ is the mean of the marginalized distribution, $P(x_i | y_1, y_2, y_3, y_4)$. The mean can be found from the joint distribution, $P(x_1, x_2, x_3, x_4, y_1, y_2, y_3, y_4)$, by marginalizing out (integrating over) all the x parameters except for $x_i$. The marginalization will yield $P(x_i, y_1, y_2, y_3, y_4)$. This is related by a constant scale factor to the distribution $P(x_i | y_1, y_2, y_3, y_4)$, and thus the mean values of the two distributions will be the same. The factorization steps that follow for the MAP estimate also hold for the mean of the marginalized distribution, with the following change: the operation argmaxxj should be replaced by integration over the variable $x_j$ ($\int x_j$). The final argmax operation over the belief at a node is replaced by taking the mean of that belief.

We factorize the joint probability differently for the computation at each node. Each node j will account for $P(x_j)$ at the very end of its calculation, and never passes that quantity to neighboring nodes. This will lead to a uniform local evidence propagation algorithrm, and outputs that are always optimal given the number of nodes which have been reported.

To proceed by example, we will described the four different cases for each of the four nodes in the network 200. First, we describe the factorization to be performed at each node so that $\text{argmax}_j$ at node j gives the same value as:

$$\text{argmax}_{x1, x2, x3, x4} P(x_1, x_2, x_3, x_4 | y_1, y_2, y_3, y_4).$$

After the four cases, we present general local evidence propagation rules, which perform the computations of each factorization.

Calculation at Node 1

By applying rule 1, then rule 2, we have:

$$P(x_1, x_2, x_3, x_4, y_1, y_2, y_3, y_4) = P(x_2, x_3, x_4, y_1, y_2, y_3, y_4 | x_1)$$
$$P(x_1)$$
$$= P(y_1, x_1)$$
$$P(x_2, x_3, x_4, y_2, y_3, y_4 | x_1)$$
$$P(x_1)$$

Applying rule 1, then 3, we continue the factorization:

$$P(x_2, x_3, x_4, y_2, y_3, y_4 | x_1) = P(x_3, x_4, y_2, y_3, y_4 | x_1, x_2)$$
$$P(x_2 | x_1)$$
$$= P(x_3, x_4, y_2, y_3, y_4 | x_2)$$
$$P(x_2 | x_1)$$

Applying rule 2 twice:

$$P(x_3, x_4, y_2, y_3, y_4 | x_2) = P(y_2 | x_2) P(x_3, y_3 | x_2) P(x_4, y_4 | x_2)$$

Applying rule 1, then rule 3:

$$P(x_3, y_3 | x_2) = P(y_3 | x_2, x_3) P(x_3 | x_2)$$
$$= P(y_3 | x_3) P(x_3 | x_2)$$

and $$P(x_4, y_4 | x_2) = P(y_4 | x_2, x_4) P(x_4 | x_2)$$
$$= P(y_4 | x_4) P(x_4 | x_2)$$

Applying all those substitutions gives:

$$P(x_1, x_2, x_3, x_4, y_1, y_2, y_3, y_4) = P(x_1) P(y_1 | x_1)$$
$$P(x_2 | x_1) P(y_2 | x_2)$$
$$P(x_3 | x_2) P(y_3 | x_3)$$
$$P(x_4 | x_2) P(y_4 | x_4)$$

Letting the argmax's slide through variables over which they are constant, we have:

$$\underset{x1,x2,x3,x4}{\text{argmax}} P(x_1, x_2, x_3, x_4, y_1, y_2, y_3, y_4) = \underset{x1}{\text{argmax}} P(x_1) P(y_1 | x_1)$$
$$\underset{x2}{\text{argmax}} P(x_2 | x_1) P(y_2 | x_2)$$
$$\underset{x3}{\text{argmax}} P(x_3 | x_2) P(y_3 | x_3)$$

The above result is for finding the MAP estimate of the joint posterior probability. As described above, to instead find the mean of the marginalized distribution, we would take the mean over $x_1$ of the distribution:

$$P(x_1, y_1, y_2, y_3, y_4) = P(x_1) P(y_1 | x_1) \int_{x2} P(x_2 | x_1) P(y_2 | x_2) \int_{x3} P(x_3 | x_2) P(y_3 | x_3)$$

Generalization

We used rule 1 to have $P(x_a)$ appear at node a. By rule 2, each edge leaving node a will contribute a factor of the form P(other variables|$x_a$). Each of those "other variable" strings are broken down again using rules 1 and 2 to simplify any extra conditioning variables by using rule 3.

This factorizes the joint probability in a way that reflects the network topology, from the point of view of node a. For a 3-node chain, where nodes b and c fork off from node a, we have:

$$P(x_a, x_b, x_c) = P(x_a)P(x_b|x_a)P(x_c|x_a).$$

Including the images y forking off from each node, we have:

$$P(x_a, x_b, x_c, y_a, y_b, y_c) = P(x_a)P(y_a|x_a)P(x_b|x_a)P(y_b|x_b)P(x_c|x_a)P(y_c|x_c).$$

Calculation at Node 2

We use the three manipulation rules to write a different factorization that is used at node 2. Now the only prior probability over a single variable will be $P(x_2)$.

$$\operatorname*{argmax}_{x1,x2,x3,x4} P(x_1, x_2, x_3, x_4, y_1, y_2, y_3, y_4) = \operatorname*{argmax}_{x2} P(x_2)P(y_2|x_2)$$
$$\operatorname*{argmax}_{x1} P(x_1|x_2)P(y_1|x_1)$$
$$\operatorname*{argmax}_{x3} P(x_3|x_2)P(y_3|x_3)$$
$$\operatorname*{argmax}_{x4} P(x_4|x_2)P(y_4|x_4).$$

Calculation at Node 3

Factorizing $P(x_1, x_2, x_3, x_4, y_1, y_2, y_3, y_4)$ to leave a factor of:

$$P(x_3), \operatorname*{argmax}_{x1,x2,x3,x4} P(x_1, x_2, x_3, x_4, y_1, y_2, y_3, y_4) = \operatorname*{argmax}_{x3} P(x_3)P(y_3|x_3)$$
$$\operatorname*{argmax}_{x2} P(x_2|x_3)P(y_2|x_2)$$
$$\operatorname*{argmax}_{x1} P(x1|x_2)P(y_1|x_1)$$
$$\operatorname*{argmax}_{x4} P(x_4|x_2)P(y_4|x_4)$$

Calculation at Node 4

Factorizing $P(x_1, x_2, x_3, x_4, y_1, y_2, y_3, y_4)$ to leave a factor of:

$$P(x_4), \operatorname*{argmax}_{x1,x2,x3,x4} P(x_1, x_2, x_3, x_4, y_1, y_2, y_3, y_4) = \operatorname*{argmax}_{x4} P(x_4)P(y_4|x_4)$$
$$\operatorname*{argmax}_{x2} P(x_2|x_4)P(y_2|x_2)$$
$$\operatorname*{argmax}_{x1} P(x_1|x_2)P(y_1|x_1)$$
$$\operatorname*{argmax}_{x3} P(x_3|x_2)P(y_3|x_3)$$

Local Propagation Rules

A single set of propagation rules will result in each of the four calculations above arriving at the four different nodes.

During each iteration, each node $x_j$ gathers evidence, then passes an appropriate message to each connecting node $x_k$. The evidence from node k is the most recent message received from it. The evidence from the image $y_j$ is $P(y_j|x_j)$.

(1) The message sent to node k from node j starts with the product Q(j;k) of the evidences at node j from the nodes other than node k, the later being the node receiving the message. This includes the evidence $P(y_j|x_j)$ of the local node.

(2) The message sent to node k is then $\operatorname{argmax}_{x_j} P(x_j|x_k) Q(j;k)$. We use a different calculation to read-out the optimum $x_j$ from node j.

(3) To find the $x_j$ which maximizes $P(x_1,x_2,x_3,x_4,y_1,y_2)$, take $\operatorname{argmax}_{x_j}$ over the product of all the evidences at node j multiplied times $P(x_j)$.

Local Propagation Rules, Discrete Case

Our propagation operations may be easier to articulate for the case of discrete probability representations. During training, we measure the co-occurrence histograms $H(y_j, x_j)$ and $H(x_j, x_k)$, for node j that is next to node k. From these histograms, we can estimate $P(y_j|x_j)$ and $P(x_j|x_k)$. If we store the concurrence histogram H(a, b) as a matrix with rows indexed by a and columns indexed by b, then P(a|b) is the row-normalized version of that matrix, after adding a small constant to each count for Poisson arrival statistics. Each row sums to one. Node j receives a column-vector message from each node. To send a message from node j to node k, node j:

(1) term-by-term multiplies each incoming message (except that from node k together, and multiplies in the column-vector $P(y_j|x_j)$, then (2) "max-matrix-multiplies" that resulting vector times $P(x_j|x_k)$.

The resulting column vector is the message to node k.

The term "max-matrix-multiplication" means term-by-term multiply the column vector times each row of the matrix and set the output for that index of the output column vector equal to the maximum of the multiplied products. For the minimum mean square error (MMSE) estimate, we replace the max-matrix-multiplication step by conventional multiplication of a vector times a matrix.

To read-out the best estimate of x at node j in the discrete probability representation, we term-by-term multiply the most recent message from each connecting node, multiply in column-vector $P(y_j|x_j)$, and the column-vector $P(x_j)$. The index which maximizes that resulting column vector is the best estimate of x, that is in the scene.

Super-resolution Problem

In one application of our invention, we estimate high-resolution details from a blurred, or lower-resolution image. In this application, the image data are the image intensities of the low-resolution image, and the "scene" data are the image intensities of the high-resolution details.

Our training images start from randomly shaped blobs covered with random surface markings, rendered by computer graphics techniques. To first obtain a bandpassed version of the image, by applying an oriented, bandpassed filter. We apply a spatially varying multiplicative local gain control factor to this bandpassed image. The gain control factor is computed as the square root of the squared and blurred value of the bandpass filtered image. This contrast gain control normalizes the intensities of image edges, easing the burden on the subsequent modeling steps. The resulting image represents the "image" information.

We also apply an oriented, high-pass filter to the rendered image, and then apply the spatially varying local gain control factor that was computed from the bandpassed image. The resulting image represents the "scene" information.

We generated many such image and scene pairs. We broke each image and scene pair into patches in a uniform gridwork at a single spatial scale. We applied PCA separately on the image and scene patches to obtain a lower dimensional representation for each patch.

We determined the needed conditional and prior probabilities from the training data, and fit mixtures of gaussians to that data. We propagated the local information as described above to obtain an estimated high resolution image.

Our invention can also be used to estimate scene motion from a sequence of images. In this application, the image data are the image intensities from two successive images of the sequence, and the scene data are successive velocity maps indicating projected velocities of the visible objects at each pixel position.

Another application for our invention is shading and reflectance disambiguation. Images can arise from shading effects on a surface, as well as from reflectance changes on the surface itself. For example, an image of a shaded surface could arise from the shaded surface itself, or from a flat surface painted to look like the shaded surface (e.g., a flat picture of it). The image data for that application would be the images themselves. The underlying scene data to be estimated would be the underlying surface shapes and reflection patterns. This method could be used to make a best estimate of the 3D scene and paint pattern depicted by an image.

In this description of the invention, we used specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for estimating scenes from images, comprising the steps of:

generating a plurality of scenes and rendering an image for each scene;

partitioning each scene and corresponding image into patches;

quantifying each patch as a vector and modeling a probability density to each vector;

representing the patches and probability densities as a network;

iteratively propagating local probability information to neighboring nodes of the network; and reading the probability density at each node to estimate the scene.

2. The method of claim 1 wherein the scenes and images are synthetically generated.

3. The method of claim 2 wherein the scenes and images are generated by computer graphics.

4. The method of claim 1 wherein the scenes and images are randomly generated.

5. The method of claim 1 wherein the patches can have multiple sizes.

6. The method of claim 1 wherein the patches are redundantly overlaid.

7. The method of claim 1 wherein the patches are organized as a gaussian pyramid having a plurality of resolution levels.

8. The method of claim 1 wherein the vectors are determined by principle components analysis.

9. The method of claim 1 wherein the network is a Markov chain.

10. The method of claim 9 wherein nodes of the network represent the patches and the associated probability densities, and edges connecting the nodes represent statistical dependencies between the nodes.

11. The method of claim 10 wherein local probabilities are propagated by factorizing joint probabilities of neighboring nodes of the network.

* * * * *